UNITED STATES PATENT OFFICE.

MICHEL EDMOND SAVIGNY, OF NEW YORK, N. Y.

PROCESS OF MAKING EXTRACTS FOR DYEING, &c.

SPECIFICATION forming part of Letters Patent No. 306,434, dated October 14, 1884.

Application filed January 11, 1884. (No specimens.) Patented in England January 9, 1884, No. 1,032.

*To all whom it may concern:*

Be it known that I, MICHEL EDMOND SAVIGNY, a citizen of the Republic of France, and a resident of the city of New York, State of New York, United States of America, have invented and am in possession of a new and useful process for the separation of coloring-matter from the so-called "yellow-colored tannic wood and plants," which possess the characteristics of the class of coloring-matter known as "catechus" or "Indian catechus," although differing therefrom, and the woods or plants treated by me are principally found in America. I do not confine myself, however, to coloring-matters produced solely from American woods or plants.

The following is a full, clear, and exact description of my said process.

My invention relates to the treatment of such woods and plants as contain coloring-matter in sufficient quantity to be practically useful in the arts for dyeing woven fabrics, furs, skins, wood, or other articles to which it is desired to give an artificial color. These woods and plants contain, in addition to the coloring-matters, the substance known as "tannin," and they may be divided into two classes—*i. e.*, tannic woods or plants colored red and tannic woods or plants colored yellow.

My process, as set forth in this specification, relates to the treatment of the tannic plants colored yellow.

My process for the treatment of the red-colored tannic plants forms the subject of another application filed by me for Letters Patent therefor, filed January 11, 1884, No. 117,145.

When a wood or plant contains tannin, or, in other words, tannic or gallic substances and little or no coloring-matter, either red or yellow, it is usually easy to obtain therefrom all the extractive substances by simply treating it with boiling water; but it is different when the wood or plant contains at the same time a large proportion of tannin and also a large proportion of coloring-matter. In such case water alone, even at a boiling temperature, will dissolve only a portion of the tannin, much of it remaining in the wood, and with it most and sometimes all the coloring-matter, red or yellow, as the case may be.

In order to obtain the coloring-matter from these woods and plants—*i. e.*, those containing tannin and coloring-matter, red as well as yellow, in large quantities—various processes have heretofore been employed; but in them all strong applications of alkali or alkaline salts have been employed to act as solvents on the coloring-matter and tannin. Now, the use of alkali or alkaline salts seriously deteriorates the dyeing qualities of the extract obtained.

My invention, which, as stated, has special reference to the treatment of the yellow tannic woods and plants, consists in a process by which I am enabled to secure all the coloring substances contained in such woods or plants, together with the tannin, without the deterioration incident to the use of alkalies or alkaline salts as heretofore used, and is as follows: I first bruise, crush, powder, or finely divide the yellow-colored tannic wood or plant, and then place the same in any suitable vat, caldron, or other vessel capable of being heated in any desired manner. I then add to the wood or plant sufficient water to cover the wood or plant. I then raise the temperature to the boiling-point, and then add a quantity of animal or vegetable oil or equivalent fatty body. The proportion of this oil or fatty body to the wood is about a quart of oil or two pounds of fatty matter to a hundred pounds of the wood or plant. I then cause the mass to boil for about half an hour, and then, for the purpose of saponifying the oil or fatty body, I pour in a quantity of solution of alkali of known strength, using sufficient to saponify the oil or fatty body, but no more. When the saponification is complete, the liquor becomes clear.

Instead of using the oil or the fatty body and the alkaline solution, thus effecting saponification, I can use as substitute therefor and produce the same result a solution of ordinary soap—either potash or soda—the percentage of alkali being so small in it, and it also being saponified, that it does not act detrimentally on the extract. I then draw off the clear liquor, which will be found to be heavily charged with the yellow coloring-matter and tannin contained in the wood or plant.

This liquor I evaporate in any suitable manner and the result is my extract, which will compare very favorably with the favorite brands of Indian catechus of the same class, the colors being so-called "fast colors."

The residues left at the bottom of the vat contain a proportion of coloring-matter of the same character as that which has been removed as stated. The treatment of such residues, and also residues left in the vats after the withdrawal of the first extracts in other processes by a process of treatment with alum, forms the subject of another application for Letters Patent hereafter to be filed by me. These extracts may be treated with the ordinary chemical agents and reactives, as now well known and practiced in the art in connection with catechus, and the same colors and shades of color will be obtained, and they may be used singly or combined with such other colors or shades of color or coloring materials as the dyer may desire. These extracts have been found by me particularly applicable for finishing, charging, and dyeing silks, and when charging silks I have found that I can beneficially combine my said extracts with tannic extracts.

The extracts obtained by me by the practice of the foregoing process I do not abandon, they forming the subject-matter of an application for Letters Patent therefor to be filed by me on even date with filing this amendment.

I do not limit myself to the specific proportions stated, because they may be somewhat departed from, according to the nature of the wood or plant being treated, and yet the advantages of my process be secured.

Having thus described my invention, I claim in the treatment of tannic woods or plants colored yellow—

The described process of making extracts, consisting in treating the wood or plant with an oil or a fatty body saponified with an alkaline solution or with a soap solution, under the influence of heat, substantially as and for the purpose set forth.

Signed at New York city, in the county of New York and State of New York, this 10th day of January, A. D. 1884.

MICHEL EDMOND SAVIGNY.

Witnesses:
JOHN H. IVES,
JOHN J. CAULDWELL.